United States Patent
Hamm et al.

(10) Patent No.: US 12,539,869 B2
(45) Date of Patent: Feb. 3, 2026

(54) METHOD AND CONTROL UNIT FOR OPERATING A RIDING FUNCTION

(71) Applicant: Bayerische Motoren Werke Aktiengesellschaft, Munich (DE)

(72) Inventors: Markus Hamm, Ismaning (DE); Christian Klinger, Leinburg (DE); Jonas Lichtenthaeler, Munich (DE); Michael Schreibauer, Aschheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 152 days.

(21) Appl. No.: 18/275,823

(22) PCT Filed: Feb. 3, 2022

(86) PCT No.: PCT/EP2022/052556
§ 371 (c)(1),
(2) Date: Aug. 4, 2023

(87) PCT Pub. No.: WO2022/167513
PCT Pub. Date: Aug. 11, 2022

(65) Prior Publication Data
US 2024/0124005 A1    Apr. 18, 2024

(30) Foreign Application Priority Data
Feb. 5, 2021   (DE) ............... 10 2021 102 779.9

(51) Int. Cl.
*B60W 50/10*   (2012.01)
*B60W 30/12*   (2020.01)
*B60W 30/16*   (2020.01)

(52) U.S. Cl.
CPC ............ *B60W 50/10* (2013.01); *B60W 30/12* (2013.01); *B60W 30/16* (2013.01);
(Continued)

(58) Field of Classification Search
CPC ....... B60W 2300/36; B60W 2540/215; B60W 2540/30; B60W 2554/406;
(Continued)

(56) References Cited

U.S. PATENT DOCUMENTS

| 1,063,864 A | * | 6/1913 | Edwards et al. | ....... B62K 27/00 |
| | | | | 280/727 |
| 4,203,500 A | * | 5/1980 | Kamiya | .................. B62H 1/12 |
| | | | | 180/219 |

(Continued)

FOREIGN PATENT DOCUMENTS

| DE | 198 43 395 A1 | 3/2000 |
| DE | 101 00 218 A1 | 7/2001 |

(Continued)

OTHER PUBLICATIONS

International Search Report (PCT/ISA/210) issued in PCT Application No. PCT/EP2022/052556 dated May 25, 2022 with English translation (5 pages).
(Continued)

*Primary Examiner* — Carl C Staubach
(74) *Attorney, Agent, or Firm* — Crowell & Moring LLP

(57) ABSTRACT

A control unit and a method are provided for controlling a riding function of a two-wheeled vehicle. The riding function is configured to guide the two-wheeled vehicle longitudinally and/or transversely in an automated manner. The control unit is configured to detect that the riding function is activated in order to bring about automated longitudinal and/or transverse guidance by the riding function, to determine that dynamic adaptation of the riding function is requested by the driver, and in response thereto, to initiate that, with the riding function being active, a control parameter influencing the dynamics of the riding function is adapted on the basis of the requested dynamic adaptation.

12 Claims, 1 Drawing Sheet

(52) U.S. Cl.
CPC ..... *B60W 2300/36* (2013.01); *B60W 2540/30* (2013.01); *B60W 2554/406* (2020.02); *B60W 2554/802* (2020.02); *B60W 2554/804* (2020.02); *B60W 2555/20* (2020.02); *B60W 2754/30* (2020.02); *B60W 2754/50* (2020.02)

(58) Field of Classification Search
CPC ..... B60W 2554/802; B60W 2554/804; B60W 2555/20; B60W 2720/10; B60W 2754/30; B60W 2754/50; B60W 30/10; B60W 30/12; B60W 30/14; B60W 30/16; B60W 50/082; B60W 50/085; B60W 50/10; B60Y 2200/12

See application file for complete search history.

(56) References Cited

U.S. PATENT DOCUMENTS

| | | | | |
|---|---|---|---|---|
| 4,385,770 | A * | 5/1983 | Mitchell | B62K 5/10 280/203 |
| 6,268,794 | B1 * | 7/2001 | Tzanev | B62J 6/056 340/427 |
| 6,508,483 | B1 * | 1/2003 | Frank | B62K 5/08 280/203 |
| 8,235,419 | B1 * | 8/2012 | Giarrusso | B62K 11/06 280/301 |
| 2008/0046159 | A1 * | 2/2008 | Baijens | B60K 31/0008 701/93 |
| 2009/0299598 | A1 | 12/2009 | Boecker et al. | |
| 2014/0200780 | A1 * | 7/2014 | Watanabe | B60T 8/1706 701/68 |
| 2016/0161526 | A1 * | 6/2016 | Miki | B60T 8/1755 701/124 |
| 2017/0197618 | A1 | 7/2017 | Ali et al. | |
| 2017/0327109 | A1 * | 11/2017 | Watanabe | B60W 50/12 |
| 2017/0327116 | A1 | 11/2017 | Heo et al. | |
| 2019/0071100 | A1 * | 3/2019 | Xavier | G05D 1/0061 |
| 2020/0384824 | A1 * | 12/2020 | Breazlan | B60G 21/06 |
| 2021/0284154 | A1 * | 9/2021 | Oshida | B60W 30/16 |
| 2021/0380117 | A1 | 12/2021 | Gonzalez | |
| 2021/0387620 | A1 * | 12/2021 | Grelaud | B60W 30/10 |
| 2022/0348227 | A1 * | 11/2022 | Foster | B60Q 1/507 |

FOREIGN PATENT DOCUMENTS

| | | |
|---|---|---|
| DE | 10 2016 219 122 A1 | 4/2018 |
| DE | 10 2018 126 834 A1 | 4/2020 |
| DE | 10 2019 108 130 A1 | 10/2020 |
| DE | 10 2019 205 245 A1 | 10/2020 |
| EP | 1 940 665 B1 | 6/2009 |

OTHER PUBLICATIONS

German-language Written Opinion (PCT/ISA/237) issued in PCT Application No. PCT/EP2022/052556 dated May 25, 2022 (6 pages).

German-language Search Report issued in German Application No. 10 2021 102 779.9 dated Nov. 4, 2021 with partial English translation (12 pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Rechtsfolgen zunehmender Fahrzeugautomatisierung, Bundesanstalt fuer Strassenwesen (BASt) [German Federal Highway Research Institute], Forschung kompakt [Research News], Edition Nov. 2012 with English Abstract (two (2) pages).

* cited by examiner

METHOD AND CONTROL UNIT FOR OPERATING A RIDING FUNCTION

BACKGROUND AND SUMMARY OF THE INVENTION

The invention relates to a method and a control unit for controlling a riding function of a two-wheeled vehicle, wherein the riding function is designed to longitudinally and/or laterally control the two-wheeled vehicle in an automated manner.

A vehicle can include one or more riding functions, in particular one or more rider assistance functions, which are designed to control the vehicle longitudinally and/or laterally in an at least partially automated manner. One example of such a riding function is an adaptive or active cruise control (ACC), which is designed to regulate the travel velocity of the vehicle to a specific target velocity. A further example is a lane keeping assistant, which is designed to keep the vehicle at a lateral target location, in particular centrally, within a lane in an automated manner.

In recent years, the demand for motor-driven two-wheeled vehicles has risen strongly, wherein in addition to classic motorcycle customers, people who previously only drove a passenger vehicle are now increasingly purchasing a motorcycle. In particular the newer customer base often has a large demand for rider assistance systems when purchasing motorcycles. To fulfill this wish, a focal point in the refinement of motorcycles is the integration of various rider assistance systems.

For example, there are already motorcycles on the market which have a so-called riding mode switch, using which the rider can change between various riding modes (e.g., rainy mode, road mode, sport mode, etc.). Defined vehicle properties (e.g., engine characteristic, ABS assistance, traction control, suspension damping, . . . ) are adapted to the respective selected riding mode in dependence on the riding mode.

For example, some motorcycles have 5 selectable riding modes: In journeys on wet routes and in difficult grip conditions, the rider is relieved in the "rain" mode by a particularly soft metering and response behavior, but nonetheless has the full torque and performance potential. The automatic stability control (ASC) responds earlier than in the so-called "road" mode.

In the "road" mode, the control systems are adjusted so that the optimum performance is achieved on a dry road. This riding mode provides a spontaneous and linear throttle response and unifies good and smooth dosing capability with homogeneous torque buildup.

In the "dynamic" mode, even more spontaneous and direct throttle response, a restrained intervention of the ASC, and tight damping take place. The "enduro" mode is distinguished by a soft throttle response, a restrained control intervention of the enduro ASC, an optimum brake distribution, and an ideal ABS control behavior. An "enduro pro" mode is designed for operation with studded tires.

In addition to such riding mode switches, equipping motorcycles with a cruise control system having distance keeping function is already known (so-called ACC). Similarly to such systems in passenger vehicles, in this case in the free travel mode the velocity is regulated to a specified target velocity. If a vehicle traveling ahead at lower velocity is detected, in the distance mode, the velocity is adapted automatically in consideration of a specified distance to the vehicle traveling ahead.

The present document relates to the technical object of increasing the level of comfort with activated riding function for automated longitudinal and/or lateral control of a two-wheeled vehicle.

The object is achieved by the claimed invention. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description which can form an invention independent of the features of the independent claims.

The basic concept of the invention is to increase the level of comfort with activated riding function for automated longitudinal and/or lateral control of a two-wheeled vehicle by a dynamic adaptation of the riding function, wherein the dynamics are adapted based on manual settings or based on detected environmental, surroundings, and/or riding behavior situations.

According to one aspect, a control unit is provided according to the invention, which is designed to control a riding function of a two-wheeled vehicle for automated longitudinal and/or lateral control, wherein the control unit is configured:
  to determine that the riding function is activated in order to effectuate automated longitudinal and/or lateral control by the riding function,
  to detect that a dynamic adaptation of the riding function is desired by the rider (in particular by manual intervention), and
  in reaction thereto, with active riding function, to effectuate that a control parameter influencing the dynamics of the riding function is adapted based on the desired dynamic adaptation.

The riding function can be designed according to SAE level 1 or higher. The riding function can comprise, for example, a cruise control, a distance controller, and/or a lane keeping assistant. The term "automated riding" can be understood in the scope of the document as riding having automated longitudinal or lateral control or automated riding having automated longitudinal and lateral control. Automated riding can involve, for example, riding over a longer time on the freeway or riding for a limited time in the context of parking or maneuvering. The term "automated riding" comprises automated riding with an arbitrary degree of automation. Exemplary degrees of automation are assisted, partially automated, highly automated, or fully automated riding. These degrees of automation were defined by the Bundesanstalt fur Straßenwesen [German Federal Highway Research Institute] (BASt) (see BASt publication "Forschung kompakt [compact research]", edition 11/2012) and/or in the specification SAE J3016R. In assisted riding, the rider continuously executes the longitudinal or lateral control, while the system takes over the respective other function in certain limits. In partially automated riding (TAF), the system takes over the longitudinal and lateral control for a certain period of time and/or in specific situations, wherein the rider has to continuously monitor the system as in assisted riding. In highly automated riding (HAF), the system takes over the longitudinal and lateral control for a certain period of time without the rider having to continuously monitor the system; however, the rider has to be capable of taking over the vehicle control in a certain time.

In fully automated riding (VAF), the system can automatically manage the riding in all situations for a specific application; a rider is no longer necessary for this application. The above-mentioned four degrees of automation correspond to the SAE levels 1 to 4 of the norm SAE J3016 (SAE—Society of Automotive Engineering). For example, highly automated riding (HAF) corresponds to level 3 of the norm SAE J3016. Furthermore, SAE level 5 is also provided as the highest degree of automation in SAE J3016, which is not included in the definition of the BASt. SAE level 5 corresponds to SAE level 4, but without restriction of the so-called operational riding domain.

A dynamic adaptation of the function desired by the rider can take place or be detected based on various conditions.

In one advantageous embodiment, a dynamic selection operating element can be provided for selecting desired dynamics of the riding function for the dynamic adaptation. The control unit is then configured to detect a desired dynamic adaptation upon selection of desired dynamics of the riding function upon actuation of the dynamic selection operating element and, with active riding function, to adapt a control parameter influencing the dynamics of the riding function based on the dynamics of the riding function selected by way of the dynamic selection operating element.

The dynamic selection operating element can be a haptic operating element, which is arranged as an independent operating element on the two-wheeled vehicle, or an operating element of an operating element group, which is designed to execute various functions, in particular at different times or with different conditions. The dynamic selection operating element can also be designed as a virtual operating element, wherein the operating element is actuated by speech or gesture, for example.

By way of the dynamic selection operating element, the rider can, for example, directly or—by selecting specific riding properties of the vehicle—indirectly, select desired dynamics of the riding function, in particular in multiple levels (e.g., comfort, dynamic, aggressive).

In a further advantageous embodiment of the invention, a riding mode selection operating element can be provided for selecting a defined riding mode, and the control unit can be configured to detect a (manually caused) desired dynamic adaptation upon selection of a defined riding mode by way of riding mode selection switch and, with active riding function, to adapt a control parameter influencing the dynamics of the riding function based on the selected riding mode.

The riding mode selection operating element can be a haptic operating element, which is arranged as an independent operating element on the two-wheeled vehicle, or an operating element of an operating element group, which is designed to execute various functions, in particular at different times or with different conditions. The riding mode selection operating element can also be designed as a virtual operating element, wherein the operating element is actuated by speech or gesture, for example. By way of the riding mode selection operating element, the rider can, for example, by selecting a specific riding mode of the vehicle, directly or—by selecting specific riding properties of the vehicle—indirectly, select desired dynamics of the riding function.

If the rider of the two-wheeled vehicle selects, for example, starting from a comfort-oriented riding mode, a dynamic riding mode, in particular a sport mode, and if this is detected by the control unit, the control unit effectuates an adaptation of at least one control parameter of the active riding function such that the dynamics of the riding function are increased. If the rider of the two-wheeled vehicle changes, for example, starting from a comfort-oriented riding mode, to a safety mode, in particular a rain mode, and this is detected by the control unit, the control unit effectuates an adaptation of at least one control parameter of the active riding function such that the dynamics of the riding function are significantly reduced.

In a further advantageous embodiment of the invention, it can be provided that the control unit is (additionally) configured:
  to detect a traffic situation corresponding to the current traffic condition, in particular a traffic density situation, and
  in reaction thereto, with active riding function, to effectuate that a control parameter influencing the dynamics of the riding function is adapted based on a detected traffic situation.

In particular, it can be provided here that the control unit is configured to effectuate an adaptation of the control parameter such that with a detected traffic density situation having low traffic density and/or a detected traffic jam situation, an adaptation of the control parameter reducing the dynamics of the riding function is effectuated or an adaptation of the control parameter reducing the dynamics which has already been effectuated is maintained, and/or that with a detected traffic density situation having high traffic density, an adaptation of the control parameter increasing the dynamics of the riding function is effectuated or an adaptation of the control parameter increasing the dynamics which has already been effectuated is maintained.

Greatly varying (surroundings) parameters can be evaluated to detect a traffic situation corresponding to the current traffic condition. For example, signals from camera, radar, and/or lidar signals can be accessed for this purpose. Alternatively and/or additionally, map attributes, in particular road attributes of a digital map, which the control unit can access directly or indirectly, can be evaluated. The items of information of a unit external to the two-wheeled vehicle can be transmitted to the two-wheeled vehicle and made accessible to the control unit.

Alternatively or additionally, it can be provided that the control unit is (additionally) configured:
  to detect a weather situation (for example, rain, fog) corresponding to the current weather condition, and
  in reaction thereto, with active riding function, to effectuate that a control parameter influencing the dynamics of the riding function is adapted based on a detected weather situation.

In particular, it can be provided here that the control unit is configured to effectuate an adaptation of the control parameter such that if a rainy situation is detected, an adaptation of a control parameter reducing the dynamics of the riding function is effectuated or an adaptation of the control parameter reducing the dynamics which has already been effectuated is maintained.

Greatly varying (surroundings) parameters can be evaluated to detect a weather situation corresponding to the current weather condition. For example, data of a camera system attached in the vehicle can be accessed for this purpose. Alternatively or additionally, data generated externally to the vehicle, which are provided, for example, by a central office (for example weather service) can be accessed.

Alternatively or additionally, it can be provided that the control unit is configured:
  to detect a riding behavior corresponding to the riding behavior of the rider, and in reaction thereto, with active riding function, to effectuate that a control parameter influencing the dynamics of the riding function is (additionally) adapted based on a detected riding behavior of the rider.

In particular, it can be provided here that the control unit is configured to effectuate an adaptation of the control parameter such that in the event of a detected riding behavior of the rider often overriding the riding function by the rider, an adaptation of the control parameter increasing the dynamics of the riding function is effectuated or an adaptation of the control parameter increasing the dynamics which has already been effectuated is maintained.

A riding behavior which often overrides can be understood, for example, as overriding the riding function multiple times within a defined time interval and/or a defined route, wherein the number of the overrides and/or the time interval and/or the route interval can be predetermined fixedly or variably in dependence on further parameters. A riding behavior overriding the riding function can be detected, for example, if the rider engages in the automated control of the riding function such that the automated riding function is (temporarily) overridden, (temporarily) interrupted, or deactivated.

Alternatively or additionally, it can be provided that the control unit is configured:
- to detect a passenger operation of the two-wheeled vehicle, in which a sidecar is coupled to the two-wheeled vehicle, and
- in reaction thereto, with active riding function, to effectuate that a control parameter influencing the dynamics of the riding function is (additionally) adapted based on a detected passenger operation of the two-wheeled vehicle.

In particular, it can be provided here that the control unit is configured to effectuate an adaptation of the control parameter such that, with a detected passenger operation, an adaptation of the control parameter reducing the dynamics of the riding function is effectuated or an adaptation of the control parameter reducing the dynamics which has already been effectuated is maintained.

The control parameter which is adapted for the dynamics change can in principle be one or more specific control parameters or can be various control parameters. In particular, it can be provided that at least one of the following parameters is adapted as a control parameter influencing the dynamics of the riding function:
- acceleration behavior during an acceleration effectuated based on the riding function,
- deceleration behavior during a deceleration effectuated based on the riding function, and/or
- jerking behavior (or derivative of the acceleration) during an acceleration or deceleration effectuated based on the riding function.

In this case, for example, to reduce the dynamics of the riding function, a reduction of the maximum permissible acceleration and/or the acceleration behavior, a reduction of the maximum permitted deceleration and/or the deceleration behavior, and/or a reduction of the maximum permitted jerk and/or the jerking behavior can be effectuated. To increase the dynamics of the riding function, an increase of the maximum permissible acceleration and/or the acceleration behavior, an increase of the maximum permitted deceleration and/or the deceleration behavior, and/or an increase of the maximum permitted jerk and/or the jerking behavior can be effectuated.

In the case of a dynamically-effectuated adaptation of a control parameter—in particular with an automated riding function designed as a longitudinal control system—the type or level or strength of the adaptation can advantageously (also) be ascertained in dependence on the distance to a target object located ahead and/or the relative velocity between the vehicle and a target object located ahead.

According to a further aspect of the invention, a method for controlling a riding function of a vehicle is proposed, wherein the riding function is designed to longitudinally and/or laterally control the vehicle in an automated manner and wherein the method comprises the following steps:
- determining that the riding function is activated to effectuate automated longitudinal and/or lateral control by the riding function,
- detecting that dynamic adaptation of the riding function is desired by the rider, and
- in reaction thereto, with active riding function, effectuating that a control parameter influencing the dynamics of the riding function is adapted based on the desired dynamic adaptation.

All above-explained advantageous embodiments of the control unit according to the invention also apply in an adapted manner to the method according to embodiments of the invention.

According to a further aspect, a software program can be provided which is configured to be executed on a processor (for example on a control unit of a vehicle), and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined with one another in diverse ways. In particular, the features of the claims can be combined with one another in diverse ways.

The invention is described in more detail hereinafter on the basis of exemplary embodiments.

DETAILED DESCRIPTION OF THE DRAWINGS

Figure 1:
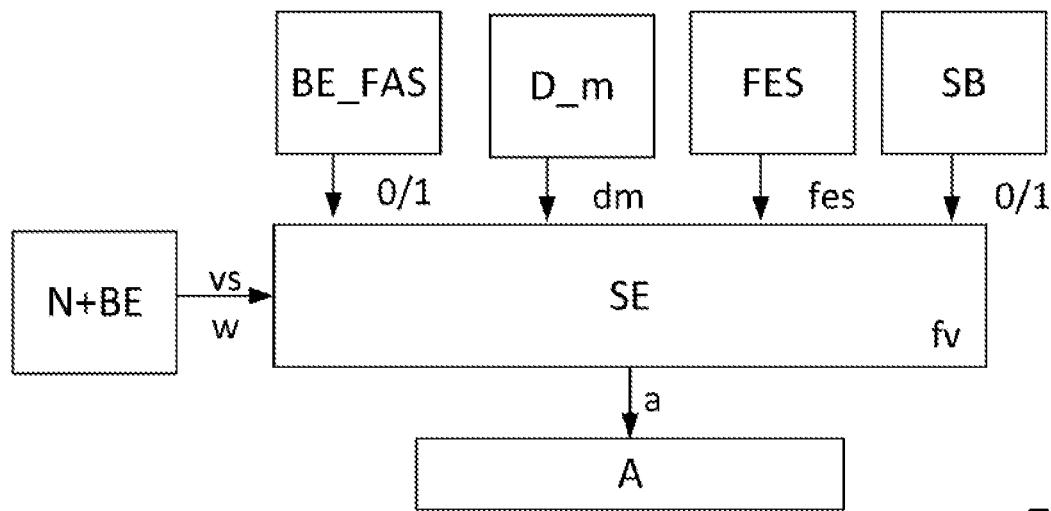
FIG. 1 shows an exemplary embodiment of a control unit according to the invention.

FIG. 1 shows in detail a control unit SE for controlling a riding function, designed as a longitudinal control system, of a two-wheeled vehicle (not shown in greater detail here). The control unit SE is designed here to longitudinally control the two-wheeled vehicle in an automated manner in consideration of vehicles traveling ahead based on existing surroundings parameters (road data, vehicles traveling ahead, maximum permissible highest or target velocities specified manually or in an automated manner). Furthermore, the control unit SE is configured:
- to determine that the longitudinal control system is activated in order to effectuate automated longitudinal control by the automated riding function,
- to detect that a dynamic adaptation of the riding function is desired, and
- in reaction thereto, with active riding function, to effectuate that a control parameter influencing the dynamics of the riding function is adapted based on the desired dynamic adaptation.

To detect that the longitudinal control system is active, the control unit SE detects a status signal 0 or 1 from an operating element BE_FAS, which indicates whether the rider has actuated the longitudinal control system by actuating the operating element BE_FAS. In addition, but not shown in detail here, the control unit SE evaluates whether, in spite of the riding function manually activated by the rider, this has been interrupted or automatically deactivated.

To detect that dynamic adaptation of the riding function is desired, the control unit SE is (directly or indirectly) connected to various systems:

dynamic selection unit D_m, the output signal dm of which comprises an indication of a manually effectuated desired dynamic adaptation of the riding function, riding mode selection unit FES, the output signal fes of which comprises an indication of the current riding mode, passenger operating unit SB, the output signal 0 or 1 of which supplies an indication whether the two-wheeled vehicle is operated with or without a passenger sidecar, and sensor and backend unit N+BE, the output signal vs or w of which comprises an indication of the current traffic situation and of the weather.

Furthermore, the control unit SE is designed to ascertain a measure of the rider behavior fv. This ascertained rider behavior fv indicates whether a behavior of the rider overriding the riding function is present or to what extent overriding behavior is detected.

Based on the received output signals dm, fes, and (0/1) of the passenger operating unit SB, the systems BE_FAS, D_m, FES, SB, and N+BE connected to the control unit SE, and the internally ascertained measure of the riding behavior fv, the control unit SE can establish or detect whether a dynamic adaptation of the riding function is desired.

If the control unit SE detects a desired dynamic adaptation of the riding function with active riding function, it effectuates an adaptation of at least one control parameter influencing the riding function based on the detected desired dynamic adaptation. In this case, this can be an adaptation of the acceleration behavior during an acceleration effectuated based on the riding function, an adaptation of the deceleration behavior during a deceleration effectuated based on the riding function, and/or an adaptation of the jerking behavior during an acceleration or deceleration effectuated based on the riding function.

In consideration of the adapted control parameter(s), the control unit SE sends output signals a to the actuator A relevant for carrying out the riding function, in particular to the drive and brake system of the two-wheeled vehicle.

Figure 2:
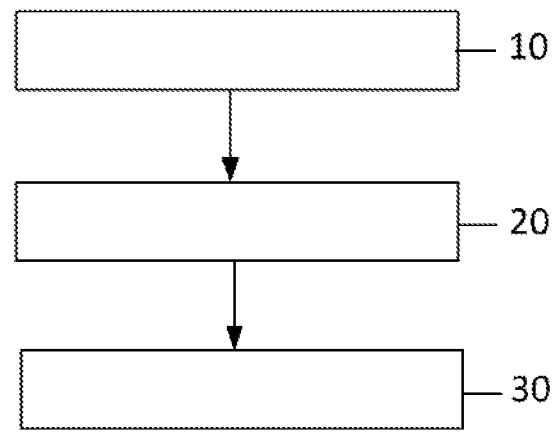
FIG. 2 shows a simplified flow chart to illustrate a method according to the invention.

Details on the control of the control unit SE, in particular for detecting a desired dynamic adaptation, will be explained on the basis of the following description of FIG. 2.

The method begins in step 10 with the detection of an active riding function, the detection of an active longitudinal control system here. If it is detected that the longitudinal control system is active (and is also not temporarily interrupted), it is continuously checked in step 20 whether a desired dynamic adaptation of the longitudinal control system is detected.

A desired dynamic adaptation can be detected by the following subsequences:

detecting a manual selection of desired dynamics of the riding function by actuating a dynamic selection operating element, detecting a change of the current riding mode by actuating a riding mode selection operating element to select a defined riding mode, detecting a change of the traffic situation corresponding to the current traffic situation, in particular detecting a change of the traffic situation from or into a traffic jam situation, a traffic situation having dense traffic, and/or a traffic situation having little traffic, detecting a change of the weather situation, in particular detecting a change from or into a rainy weather situation, detecting a change of the riding or rider behavior, in particular detecting a change from or into a riding behavior overriding the automated riding system, and/or detecting a change of a possible passenger operation of the two-wheeled vehicle.

Based on the above-mentioned detected change, the control unit (possibly in consideration of further parameters or the current dynamics of the riding function) can establish a desired dynamic adaptation. If this is the case, in the next step 30, an adaptation of at least one control parameter is effectuated based on the desired dynamic adaptation.

It can therefore be ensured by embodiments of the invention that with active automated riding function, an optimum control of the automated riding function corresponding to the desired dynamics can be ensured at each point in time.

The invention claimed is:

1. A control unit for controlling a riding function of a two-wheeled vehicle, wherein the riding function is configured to longitudinally and/or laterally control the two-wheeled vehicle in an automated manner, and wherein the control unit is configured:

to determine that the riding function is activated in order to effectuate automated longitudinal and/or lateral control by the riding function, to detect that a dynamic adaptation of the riding function is desired by a rider, in reaction to a detection that the dynamic adaption of the riding function is desired by the rider, with the riding function being active, to effectuate that a control parameter influencing dynamics of the riding function is adapted based on the dynamic adaptation, to detect a riding behavior of the rider, and in reaction to detecting the riding behavior of the rider, with the riding function being active, to effectuate that the control parameter influencing the dynamics of the riding function is adapted based on the detected riding behavior of the rider, wherein:

the riding behavior of the rider comprises overriding the riding function multiple times within a defined time interval and/or a defined route, a riding mode selection operating element is provided to select a defined riding mode, wherein the rider can use the riding mode selection operating element to switch between different riding modes, and vehicle properties are adapted to the selected riding mode, and the control unit is further configured to detect a desired dynamic adaptation upon selection of the defined riding mode by way of the riding mode selection operating element and, with the riding function being active, to adapt the control parameter influencing the dynamics of the riding function based on the defined riding mode.

2. The control unit according to claim 1, wherein:

for the dynamic adaptation, a dynamic selection operating element is provided to select desired dynamics of the riding function, and the control unit is further configured to detect the dynamic adaptation upon selection of the desired dynamics of the riding function and, with the riding function being active, to adapt the control parameter influencing the dynamics of the riding function based on the selected dynamics of the riding function.

3. The control unit according to claim 1, wherein the control unit is further configured:
to detect a traffic situation corresponding to a current traffic condition, and
in reaction to detecting the traffic situation, with the active riding function being active, to effectuate that the control parameter influencing the dynamics of the riding function is adapted based on the detected traffic situation.

4. The control unit according to claim 3, wherein the current traffic condition is a traffic density situation.

5. The control unit according to claim 4, wherein the control unit is further configured such that when the traffic density situation has a low traffic density and/or a detected traffic jam situation, an adaptation of the control parameter reducing the dynamics of the riding function is effectuated or an adaptation of the control parameter reducing the dynamics which has already been effectuated is maintained.

6. The control unit according to claim 4, wherein the control unit is further configured such that when the traffic density situation has a high traffic density, an adaptation of the control parameter increasing the dynamics of the riding function is effectuated or an adaptation of the control parameter increasing the dynamics which has already been effectuated is maintained.

7. The control unit according to claim 1, wherein the control unit is further configured:
to detect a weather situation corresponding to a current weather condition, and
in reaction to detecting the weather situation, with the riding function being active, to effectuate that the control parameter influencing the dynamics of the riding function is adapted based on the weather situation.

8. The control unit according to claim 1, wherein the control unit is further configured to effectuate an adaptation of the control parameter such that upon detecting the riding behavior of the rider, an adaptation of the control parameter increasing the dynamics of the riding function is effectuated or an adaptation of the control parameter increasing the dynamics which has already been effectuated is maintained.

9. The control unit according to claim 1, wherein the control unit is further configured:
to detect a passenger operation of the two-wheeled vehicle, in which a sidecar is coupled to the two-wheeled vehicle, and
in reaction to detecting the passenger operation of the two-wheeled vehicle, with the riding function being active, to effectuate that the control parameter influencing the dynamics of the riding function is adapted based on the passenger operation of the two-wheeled vehicle.

10. The control unit according to claim 1, wherein at least one of the following parameters is adapted as the control parameter influencing the dynamics of the riding function:
acceleration behavior during an acceleration effectuated based on the riding function,
deceleration behavior during a deceleration effectuated based on the riding function, or
jerking behavior during the acceleration or the deceleration effectuated based on the riding function.

11. The control unit according to claim 1, wherein in an event of an adaptation of the control parameter influencing the dynamics of the riding function, a type of the adaptation is ascertained in dependence on a distance to a target object located ahead and/or a relative velocity between the vehicle and the target object located ahead.

12. A method for controlling a riding function of a two-wheeled vehicle, wherein the riding function is configured to longitudinally and/or laterally control the two-wheeled vehicle in an automated manner, the method comprising:
determining that the riding function is activated in order to effectuate automated longitudinal and/or lateral control by the riding function,
detecting that a dynamic adaptation of the riding function is desired by a rider,
in reaction to detecting that the dynamic adaptation of the riding function is desired by the rider, with the active riding function being active, effectuating that a control parameter influencing dynamics of the riding function is adapted based on the dynamic adaptation,
detecting a riding behavior of the rider, and
in reaction to detecting the riding behavior of the rider, with the riding function being active, effectuating that the control parameter influencing the dynamics of the riding function is adapted based on the detected riding behavior of the rider, wherein;
the riding behavior of the rider comprises overriding the riding function multiple times within a defined time interval and/or a defined route,
a riding mode selection operating element is provided to select a defined riding mode, wherein the rider can use the riding mode selection operating element to switch between different riding modes, and vehicle properties are adapted to the selected riding mode, and
the method further comprises detecting a desired dynamic adaptation upon selection of the defined riding mode by way of the riding mode selection operating element and, with the riding function being active, adapting the control parameter influencing the dynamics of the riding function based on the defined riding mode.

* * * * *